(No Model.)
J. KINDER.
DRIVING BELT.
No. 355,453. Patented Jan. 4, 1887.
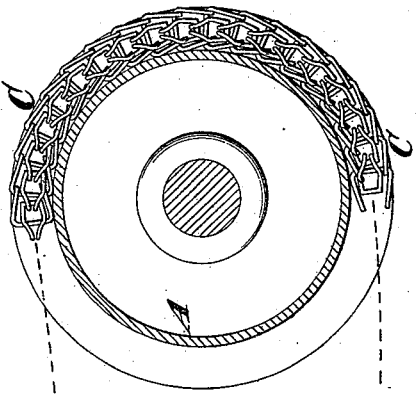
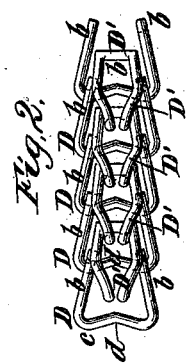
Witnesses:
Inventor:
Julius Kinder
by his attys
Brown & Hall

UNITED STATES PATENT OFFICE.

JULIUS KINDER, OF BROOKLYN, ASSIGNOR TO THE SOLID LINK CHAIN MANUFACTURING COMPANY, OF NEW YORK, N. Y.

DRIVING-BELT.

SPECIFICATION forming part of Letters Patent No. 355,453, dated January 4, 1887.

Application filed July 1, 1886. Serial No. 206,856. (No model.)

*To all whom it may concern:*

Be it known that I, JULIUS KINDER, of Brooklyn, in the county of Kings and State of New York, have invented a new and useful Improvement in Belt or Band Gearing for Machinery, of which the following is a specification.

The object of my invention is to provide belt or band gearing for machinery which shall have all the durability due to the belt or band being made of metal, and in which pulleys or sheaves of very small size as compared to the thickness of the belt or band, and having an even or smooth periphery destitute of teeth or sprocket projections, may be employed.

My invention consists, essentially, in the combination, with pulleys or sheaves having even or smooth peripheries, of a metallic driving belt or band embracing the pulleys or sheaves, and consisting of a chain which is substantially round or circular in its transverse section, and is flexible in planes radiating from its center in all directions.

In the above combination the chain is preferably so constructed that it is slightly elastic or yielding in the direction of its length, and may be made or composed of two series of links arranged alternately lengthwise of the chain and in planes which are transverse to each other.

In the accompanying drawings, Figure 1 is a sectional view of two pulleys and a driving belt or band which embodies my invention, the portions of the belt or band which extend between the pulleys being shown only by dotted lines. Fig. 2 represents, on a larger scale, a portion of the driving belt or band, showing more clearly its construction; and Fig. 3 is an end view or transverse section of the belt or band, showing its substantially circular form.

Similar letters of reference designate corresponding parts in the several figures.

A B designate two pulleys, between which the belt or band C passes, and which have in their peripheries grooves receiving the belt or band. These grooves are either wedge shape or V shape in transverse section, or they may be plainly concave or semicircular in their transverse section. The pulleys or sheaves A B have smooth or even peripheries, or, in other words, their peripheries are plain circles, destitute of any teeth or sprocket projections.

The driving belt or band C consists of a chain which is flexible in planes radiating in all directions from its longitudinal center as distinguished from a driving chain composed of flat links, and which is therefore flexible in one plane only. The chain being flexible in all directions, or in planes radiating in all directions from its longitudinal center, will hug the pulleys closely, no matter which side of the chain comes innermost in its passage around the pulleys or sheaves, and it is of substantially circular form, as shown in Fig. 3, so as to properly hug a grooved pulley or sheave. The chain, owing to its construction, is slightly elastic or yielding in the direction of its length, and is of enormous strength as compared to the weight of metal employed in making it and the degree of flexibility which it has.

It will be seen that the pulleys or sheaves over which the chain belt or band drives are very small in diameter as compared to the size of the belt or band and the power which it will properly transmit, and in this respect the drawing is not exaggerated, for a chain of the size shown will operate effectively with pulleys as small as are there shown.

The construction of the chain is best shown in Fig. 2, and it will be there seen that it is composed of two series of links, the links of one series being designated by the letter D, and the links of the other series being designated by the letter D'. The links of these two series are in planes transverse to each other, and the links D and D' are alternated in the length of the chain, as will be clearly seen from Fig. 2. Although the links of the two series D D' are in planes which are transverse to each other, these planes are not usually straight, but have a slight spiral tendency, so that in a long piece of chain the planes in which the two series of links are situated have a slight spiral turn, which in several feet of the chain will amount to a change of the links throughout a substantial portion of or an entire circle. While I do not restrict myself to this arrangement of the links in planes forming very long spirals, it is advantageous, as it may produce in the chain a slight tendency to turn on its longitudinal axis while it is running around sheaves or pulleys. As clearly shown in Fig. 2, each of the links D D' consists of a cross portion, c, and end portions, which are bent in the same direction to form loops b, and in the manufacture of the chain the loops b of each link are made to embrace the cross-bars or cross portion c of the adjacent link. I have here shown the cross portion c of each link as having a slight inward bend or indentation, d, in the same direction as the loops b. Such a construction adds to the strength of the link and is not claimed as part of this invention, but is described and claimed in my pending application for Letters Patent, Serial No. 206,859, filed July 1, 1886.

Such a driving-belt as I have above described constitutes essentially a new article of manufacture, although fragile watch-chains and analogous ornamental chains have been made before of a like construction, save that they did not have the inward bend or indentation d; but such chains as have been before made or rendered incapable, by their extreme lightness, of practical use as driving-belts. My driving-belt is very durable. It is flexible in all directions radially from its center, and will drive very smoothly from and upon pulleys or sheaves which are destitute of teeth or sprocket-projections and which are of very small size as compared to the thickness of the chain.

What I claim as my invention, and desire to secure by Letters Patent, is—

1. In belt or band gearing for machinery, the combination, with pulleys or sheaves having even or smooth peripheries, of the metallic belt or band embracing the pulleys or sheaves, and consisting of the chain, which is substantially round or circular in its transverse section and is flexible in planes radiating from its center in all directions, substantially as herein described.

2. In belt or band driving gearing for machinery, the combination, with pulleys or sheaves having even or smooth peripheries, of the metallic belt or band embracing the pulleys or sheaves, and consisting of the chain, substantially round or circular in its transverse section and flexible in planes radiating from its center in all directions, and which is slightly elastic or yielding in the direction of its length, substantially as herein described.

3. In belt or band gearing for machinery, the combination, with pulleys or sheaves having even or smooth peripheries, of a metallic driving belt or band consisting of a chain substantially round or circular in transverse section and composed of two series of links arranged alternately lengthwise of the chain and in planes transverse to each other, substantially as herein described.

JULIUS KINDER.

Witnesses;
   FREDK. HAYNES,
   EMIL HERTER.